March 16, 1965
J. JONES
3,173,844
REACTOR REFUELLING MACHINES
Filed Nov. 25, 1960
5 Sheets—Sheet 5
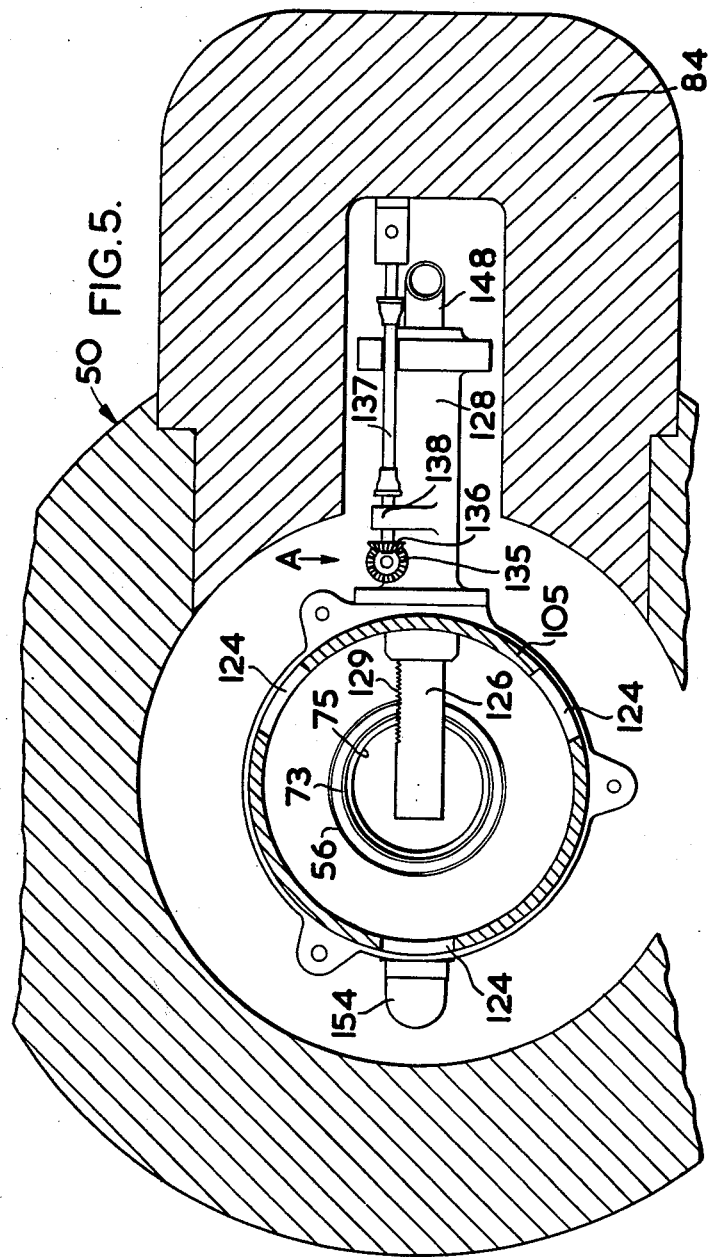

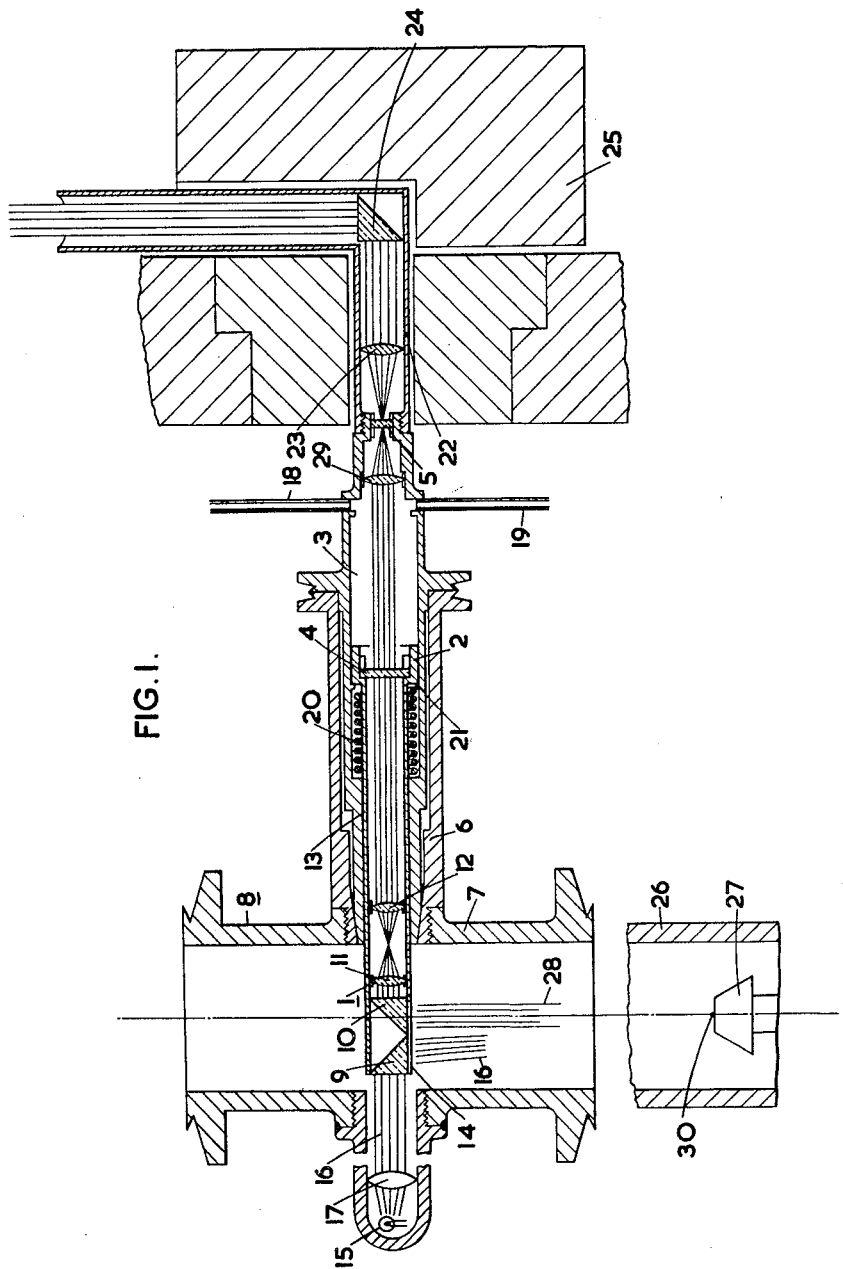
FIG. I.

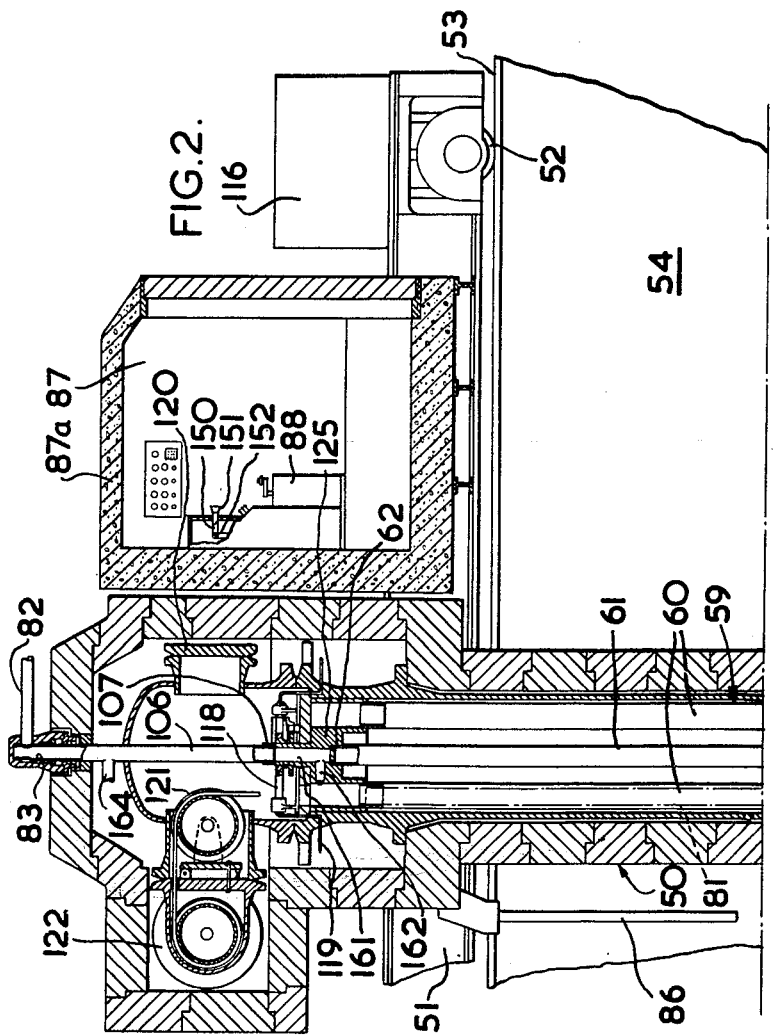

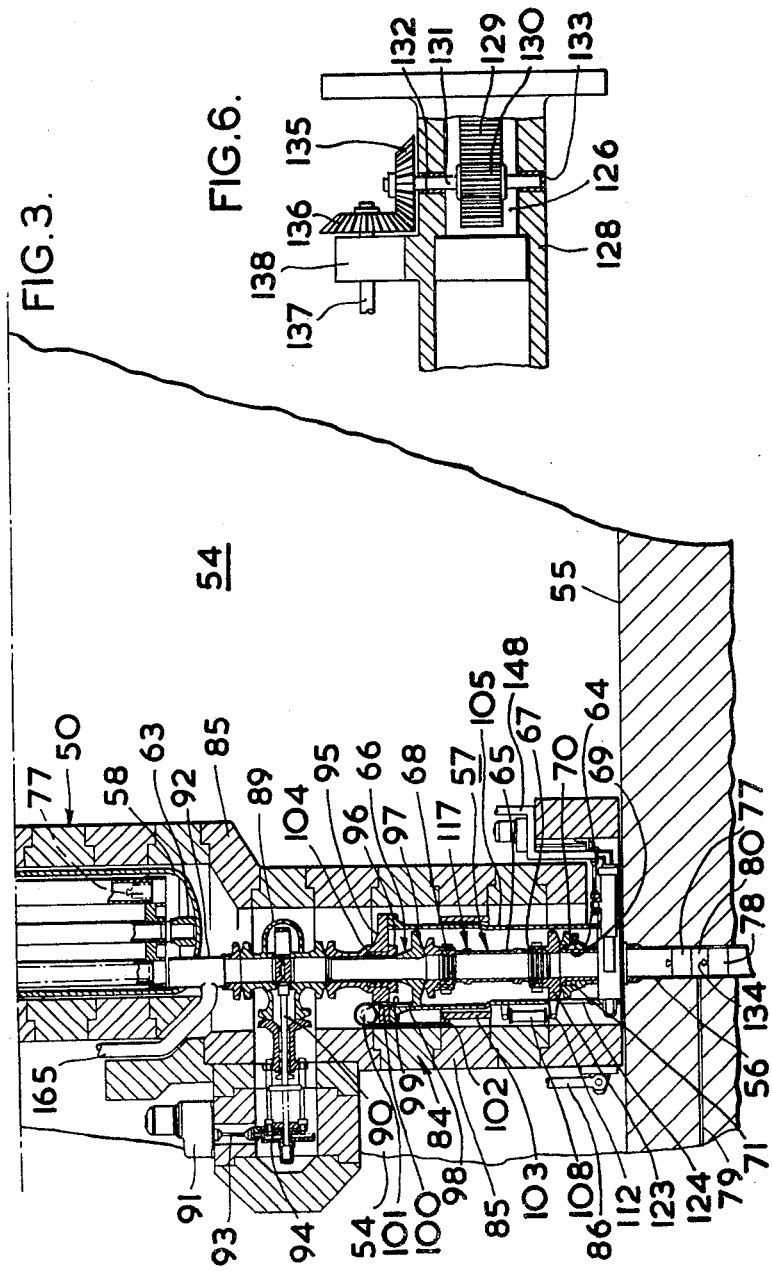

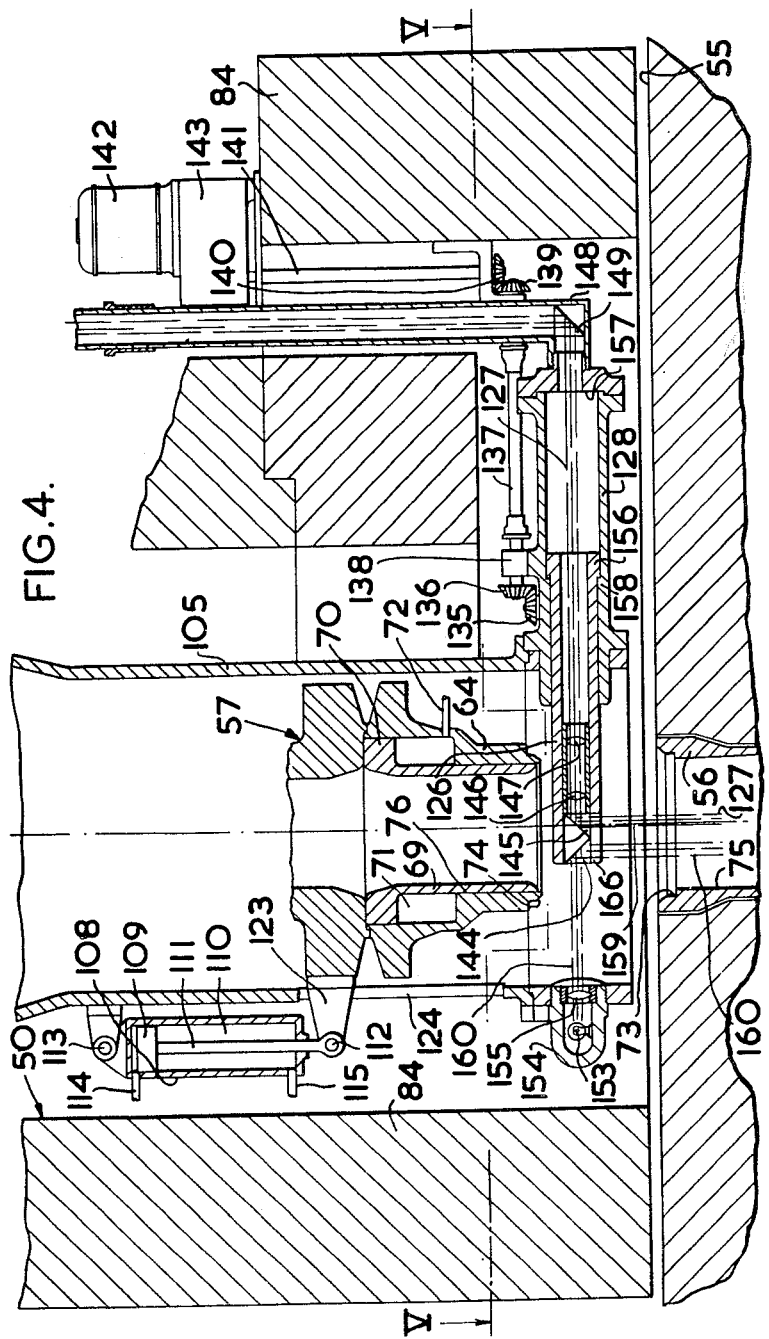

3,173,844
REACTOR REFUELLING MACHINES
Jack Jones, Manchester, England, assignor to United Kingdom Atomic Energy Authority, London, England,
Filed Nov. 25, 1960, Ser. No. 71,644
Claims priority, application Great Britain, Nov. 26, 1959, 40,173/59
3 Claims. (Cl. 176—30)

This invention relates to reactor refueling machines of the kind traversable across the refuelling face of a reactor to connect with a refuelling channel extending from the refuelling face towards the core of the reactor and thus define a path with the channel for the transfer of nuclear fuel between the interior of the refuelling machine and the reactor core.

Before connection can be made between the refuelling machine and the refuelling channel, these two components must be accurately aligned with each other. This is particularly important in refuelling machines of the above type which refuel the reactor whilst the latter is under load, as under these conditions, the connection must remain pressure-tight.

According to the invention, a reactor refuelling machine of the kind traversable across the refuelling face of a reactor to connect with a refuelling channel extending from the refuelling face towards the core of the reactor and thus define with the channel a path for the transfer of nuclear fuel between the interior of the refuelling machine and the reactor core is characterized in that the refuelling machine is equipped with means for sighting the interior of the channel from a sighting point external the machine, said means comprising an optical sighting member insertable into and withdrawable from the path of fuel transfer along a plane traversing the said path, the sighting member being capable of receiving light rays from the interior of the channel and of transmitting said light rays along a refracted path towards the external sighting point.

Two embodiments of the invention will now be described by way of example with reference to the accompanying drawings wherein:

FIGURE 1 is a side view in medial section of the first embodiment,

FIGURES 2 and 3 combine to form a side view in medial section of the second embodiment.

FIGURE 4 is an enlarged detail of FIGURE 3,

FIGURE 5 is a section taken on the lines V—V of FIGURE 4, and

FIGURE 6 is a fragmental detail, partly in section and looking in the direction of the arrow "A" of FIGURE 5.

Referring first to FIGURE 1, a charge tube section 8 is shown of a reactor refuelling machine traversable across the refuelling face of a reactor to connect with a refuelling channel 26 extending from the refuelling face towards the core of the reactor and thus define a path with the channel 26, for the transfer of nuclear fuel between the interior of the refuelling machine and the reactor core. The charge tube section 8 carries an optical sighting member 1 forming an extension to a steam operated piston 2 movable within a piston chamber 3, the piston 2 and chamber 3 having sealed glass windows 4 and 5 respectively. The piston chamber 3 is carried by a supporting sleeve 6 screwed into the wall 7 of the tube section 8. The sighting member 1 comprises a pair of reflecting prisms 9, 10 and a pair of optical lenses 11, 12 all of which are enclosed in an open ended tube 13 attached to the inner side of the piston 2. A further lens 29 is disposed within the piston chamber 3 adjacent the glass window 5. The tube 13 is provided with a cut-away portion 14 to expose the undersides of the prisms 9, 10. A light source 15 transmits a beam of light 16 through a lens 17 to the prism 9, whence it is directed downwards through the cut-away portion 14. The operating steam for the piston 2 is admitted to the piston chamber 3 through an inlet 18 and is exhausted to a condenser (not shown) through an outlet 19. The piston 2 is biased towards the right by a compression spring 8 so that the sighting member 1 is normally retained in a withdrawn position from the interior of the charge tube section 8. A stop 21 within the chamber 3 limits the travel of the piston 2 towards the charge tube section 8. Attached to the outer end of the piston chamber 3 and adjacent the glass window 5 is a right angled tube 22 containing a lens 23 and reflecting prism 24, the tube passing through lead shielding 25 surrounding the refuelling machine and terminating in an eyepiece (not shown).

In operation, the refuelling channel 26 is uncovered to expose the upper end 27 of a channel sealing plug and the refuelling machine is placed into position so that the axes of the charge tube section 8 and the channel 26 roughly coincide. The lead shielding 25 protects the reactor personnel from radiation omitted from the channel 26.

Steam is now admitted to the piston chamber 3 through the inlet 18 to move the piston 2 up against the stop 21 and thus insert the sighting member 1 into the charge tube section 8, as shown. The beam of light 16 transmitted by the light source 15 through the prism 9 illuminates the interiors of the tube section 8 and channel 26 as well as the upper end 27 of the sealing plug. Reflected light rays, indicated by a beam 28, then pass along a refracted path through the prism 10 lens 11, 12, window 4, lens 29, window 5, lens 23 and prism 24 to the eye piece in the upper end of the tube 22. Thus a refuelling machine operator, by looking down through tube 22, may view the interior of the channel 26. The refracted path taken by the light rays avoids subjecting the operator to harmful radiation. The upper end 27 of the sealing plug is provided with a sighting point or target 30, and the upper end of the tube 22 with a pair of cross wires so that if the refuelling machine operator now manoeuvres the machine into a position where the cross wires coincide with the reflected image of the target point 30 he will then know that the tube section 8 of the refuelling machine is accurately centred over the channel 26. A path for the transfer of nuclear fuel between the interior of the refuelling machine and the reactor core is thus established. An extension of the charge tube section 8 is now connected in a sealing manner to the upper end of the channel 26. When this is done, steam in the piston chamber 3 is exhausted through the outlet 19 whereupon the spring 20 withdraws the sighting member 1 from the interior of the charge tube section 8. A grab may now be lowered down through the interior of the refuelling machine into the channel 26 to withdraw the sealing plug and refuelling of the reactor commenced.

The piston chamber 3, and inlet and outlet pipes 18, 19, are provided with insulation (not shown) to prevent condensation of steam in the piston chamber 3. Other pressure fluids may be used instead of steam, as long as they are transparent.

FIGURES 2 to 6 illustrate the second embodiment and also show a refuelling machine in more detail.

Referring to FIGURES 2 to 6, a refuelling machine 50 is mounted on a carriage 51 having wheels 52 engaging with a track 53 supported by concrete walls 54 so that the machine 50 is traversable across a refuelling face 55 of a steam-cooled reactor to connect with a refuelling channel 56 extending from the refuelling face 55 towards the core of the reactor and thus define a path with the channel 56 for the transfer of nuclear fuel between the interior of the refuelling machine and the reactor core.

The machine 50 houses a pressure vessel 58 from which extends a two-part charge tube 57 comprising a stationary part 92 attached to the pressure vessel 58 and a part 117 movable, in a telescoping manner, within the stationary part 92. The vessel 58 contains a fuel magazine 59 comprising a ring of six upright tubes 60 mounted on a shaft 61 rotatable in bearings 62, 63. The charge tube part 117 is made up of a coupling end 64, an intermediate section 65 and an upper end 66.

The components 64, 65 and 65, 66 are interconnected by bellows connections 67, 68 respectively to provide flexibility in the charge tube part 92. The coupling end 64 houses a sealing sleeve 69, the upper end of which is stepped to form a piston 70 movable within a chamber 71. The upper face of the piston 70 is exposed to pressure within the charge tube 57 and the lower face thereof to pressure within the chamber 71. Pressure in the chamber 71 is varied by steam admitted to or evacuated from the chamber by way of a steam pipe 72.

The upper end of the refuelling channel 56 has a recess 73 to receive a spigot 74 on the coupling end 64. The bore 75 of the channel 56 is the same size as the bore 76 of the coupling end 64. When refuelling is not in progress, the upper end of the channel 56 is covered by a plate, removal of which exposes a sealing plug 77 carrying a central target 134. Beneath the plug 77 and separated by an interspace 80 is a further sealing plug 78.

The plugs 77, 78 are of the type wherein pressure on one side thereof results in their being forced hard against the bore 75 of the channel 56. Under normal operating conditions, the plug 78 provides the primary seal against out-leakage of reactor coolant, the underside of the plug being exposed to the full force of reactor coolant pressure, whilst plug 77, being exposed to no great pressure, is a relatively loose fit in the channel bore, providing a "backing up" seal in the event of excessive leakage past the plug 78. A pipe line 79 connects the interspace 80 with the alternatives of a steam pressure source, the atmosphere or an extraction pump. Under normal operating conditions the line 79 is connected to the extraction pump in order to draw off from the interspace 80 any air leaking past the plug 77 and steam leaking past the plug 78.

One of the tubes 60 of the fuel magazine 59 contains a fuel element 81 ready for placing in the reactor core, a second is available for storage of an "irradiated" fuel element 81 when withdrawn from the reactor core, a third contains a "spare" plug 77, a fourth a "spare" plug 78, and the fifth and sixth tubes 60 are available for storage of the plugs 77, 78 when removed from the channel 56 in a manner to be described. A steam supply line 82 is connected to the upper end of the pressure vessel 58 through a rotatable joint 83.

The axis of the stationary part 92 of the charge tube 57, and hence that also of the movable part 117 coincide with the pitch circle of the tubes 60 of the magazine 59. The magazine 59 is rotatable in a series of stages by a steam operated rack and pinion assembly 118 disposed in the upper end of the pressure vessel 58. Steam is admitted to the assembly 118 through a pipe line 119. Each stage of rotation of the magazine 59 brings a magazine tube 60 into register with the charge tube 57. Access to the assembly 118 is gained through an inspection door 120. The door 120 also provides access to a winch assembly 121 driven by a motor 122.

The refuelling machine 50 is provided with a thick radiation shielding 84 formed by blocks 85. Abutting side faces of the blocks 85 are "staggered" so as to prevent direct path of radiation. The weight of the shielding 84 is taken by a ring of tie rods 86 extending from the carriage 51. The carriage 51 also carries a control cabin 87 provided with shielding 87a. The wheels 52 of the carriage 51 are driven by an electric motor 116, the speed and direction of rotation of which is varied by controls 88 within the cabin 87.

A gate valve 89 is provided in the stationary part 92 of the charge tube 57 for isolation of the pressure vessel 58. The gate valve 89 is opened and closed by axial movement of a valve spindle 90 operated by an actuating motor 91 through a driving shaft 93 and gear assembly 94.

The lower end of the stationary charge tube part 92 carries a flange 95 the under face of which is recessed to accommodate a gland box 96 having sealing rings 104 for sealing the two parts 92, 117 of the charge tube 57. The upper end 66 of the charge tube part 117 carries a collar 97 having three spaced lugs 98 (only one of which is shown) attached thereto. The lugs 98 provide anchorage points for wire ropes 99 which pass through holes 100 in the flange 95 and over pulleys 101 carried by the flange to terminate at lugs 102 attached to weights 103. The weights 103 provide a counter-balance to the weight of the charge tube part 117.

The charge tube part 117 is telescoped in and out of the fixed charge tube 57 by three radially disposed actuating units 108, attached to a tubular structure 105 extending downwardly from the lower face of the flange 95 of the charge tube part 92. Each unit 108 includes a piston 109 movable within a piston chamber 110 and having a piston rod 111 connected by a pin 112 to an arm 123 extending radially from the coupling end 64 through an elongated hole 124 in the structure 105. The piston chamber 110 is attached to the structure 105 by a pin 113, the pins 112, 113 allowing side movement of the charge tube 57 relative to the structure 105. Pipe lines 114, 115 connect opposite ends of the piston chamber 110 with the alternatives of high pressure steam or a steam condenser. Thus, when pipe line 114 is connected to the steam supply, a pipe line 115 is connected to the condenser and vice versa. Similarly, the pipe line 72 connects the pressure control chamber 71 within the coupling part 64 to the alternatives of high pressure steam or a steam condenser.

The rotatable joint 83 provides connecting of the steam line 82 with a pipe 106 terminating in an extension 107 of a block 125 housing the shaft bearing 62. Inter-connected passages 161, 162 connect the interior of the pipe 106 with the interior of the magazine tube 60 in register with the charge chute 57. Branches 164, 165 from the pipe 106 and charge tube part 92 respectively connect the magazine 59 with a steam cooling and re-circulating unit.

Referring now to FIGURES 4 to 6, the refuelling machine 50 is equipped with means for sighting the interior of the channel 56 from the control cabin 87 (FIGURE 2) the means comprising an optical sighting member 126 insertable into and withdrawable from the path of fuel transfer between the machine 50 and channel 56 and being capable of transmitting light rays from the interior of the channel along a refracted path 127 towards the control cabin 87.

In greater detail, the sighting member 126 is of tubular form and is housed, in a telescopic manner, within a tubular guide 128. The guide 128 penetrates the structure 105 and is orientated horizontally so that the sighting member 126 can traverse below the coupling end 64 when the sealing sleeve 69 is in its withdrawn position, which is the position shown. The outer wall of the sighting member 126 is machined to form a toothed rack 129 (FIGURES 5 and 6) engaging with a pinion 130 mounted on a shaft 131 located in apertures 132, 133, penetrating the walls of the guide 128. The upper end of the shaft 131 carries a bevel gear 135 engaging with another bevel gear 136 mounted on one end of a shaft 137 rotatable in a support 138 integral with the guide 128.

The other end of the shaft 137 carries another bevel wheel 139 engaging with a bevel wheel 140 mounted on the end of a further shaft 141 connected to a driving motor 142 through a reduction gear 143. The speed and direction of rotation of the motor 142 are controlled from the control cabin 87 (FIGURE 2). Rotation of the shaft 141 therefore results in axial movement of the sighting member 126. A shoulder 156 carried by the member 126 and engaging with either a cover 157 of the guide 128 or a stop 158 in the bore thereof limits the travel of the sighting member 126.

The sighting member 126 houses reflecting prisms 144, 145 and optical lenses 146, 147. The sighting member has a cut-away portion 166 to expose the prisms 144, 145 to the interior of the channel 56. A right-angled tube 148 having one end connected to the outer end of the guide 128 houses a reflecting prism 149 disposed in the "elbow" of the tube 148. The tube 148 extends upwardly from the guide 128 to the control cabin 87 (FIGURE 2) where a right-angled extension 150 to its upper end carries an optical eye-piece 151 incorporating cross-wires. A reflecting prism 152 is disposed in the junction of the tube 148 and extension 150.

An electric lamp 153 is contained in a housing 154 screwed into the structure 105 at a point opposite the sighting member 126. The housing 154 carries a lens 155. The lens 155, 146, 147 and prisms 144, 145, 149 are aligned with one another. When the shoulder 156 of the sighting member 126 is engaged with the stop 158, the prism 145 is disposed above the axis 159 of the channel 56.

In operation, with the channel 56 uncovered, the piston 70 is held in the position shown by the admission of steam to the piston chamber 71 and the pistons 109 likewise in the chambers 110 by the admission of steam through the lines 115 whilst the lines 114 are connected to a condenser. With the gate valve 89 open the refuelling machine 50 is then manoeuvred into an approximate position above the channel 56 by aligning sighting marks carried by the machine with similar sighting marks on the charge face 55.

With the lamp 153 switched on and the sighting member in the position shown that is to say, with the shoulder 156 against the stop 158, a beam of light 160 is transmitted by the lamp 153 through the prism 144 into the interior of the channel 56. Light rays reflected from the interior of the channel 56 then pass along the refracted path 127 which comprises the prism 145, lenses 146, 147, prisms 149, 152 and eye-piece 151. By looking through the eye-piece 151, an operator in the control cabin can thus see within the channel 56. The refracted path of the light rays avoids subjecting the operator to harmful radiations. The operator can now manoeuvre the refuelling machine 50 about the charge face 55 until the target 134 carried on the plug 77 coincides with the cross-wires in the eye-piece 151. When this is done, the operator then knows that the charge tube 57 is accurately aligned with the channel 56.

The sighting member 126 is now withdrawn from the path of fuel transfer by operation of the motor 142. The pistons 109 of the units 108 are moved down in the piston chambers 110 by connecting the pipe lines 115 to a condenser and admitting steam through the lines 114. Downward movement of the pistons 109 results in a downward movement of the charge tube section 117, against the balance weights 103 to engage the spigot 74 of the coupling end 64 with the recess 73 in the channel 56. When this is done, the piston chamber 71 is evacuated by connecting the pipe line 72 to a condenser so causing the sealing sleeve 69 to be moved downwardly by ambient pressure within the charge tube 57 thus causing the coupling end 64 to seal with the channel 56. The pipe line 79 is next connected to atmosphere to equalise the pressure across the sealing plug 77 and the plug removed from the channel 56 by a grab device associated with the winch 121. The withdrawn plug is then stored in one of the empty magazine tubes 60.

The pressure vessel 58 and charge tube 57 is then pressurized to reactor pressure by the admission of steam through the steam line 82. This equalises the pressure across the sealing plug 78, allowing it to be removed and stored in a magazine tube 60 in the manner of the plug 77. The winch 121 and assembly 118 are then used to withdraw the irradiated fuel element 81 from the reactor core and to store it in a vacant magazine tube 60. The withdrawn fuel element is then replaced by the "new" fuel element 81 in an adjacent magazine tube 60. The sealing plugs 77, 78 are then replaced by the "spare" plugs 77, 78 and the gate valve 89 closed. The sealing sleeve 69 and charge tube section 117 are next restored to their original, withdrawn, positions. With the gate valve 89 closed, decay heat is removed from the irradiated fuel element 81 in its magazine tube 60 by the circulation of steam through the pressure vessel 58 by means of the unit connected to the pressure vessel 58 by way of the branch pipes 164, 165.

I claim:

1. In combination, a nuclear reactor comprising a reactor core, a core shield defining a refuelling face spaced from the core, a core access channel extending inwardly from the refuelling face and towards the reactor core, a plug member disposed within the channel and adapted to give visual indication of the axis of the channel from a sighting point adjacent the refuelling face, and a reactor refuelling machine comprising a fuel storage chamber, a fuel transfer having a rectilinear axis extending outwardly from the storage chamber, means for connecting the extended end of the transfer tube with the refuelling face end of the access channel, means for transferring fuel between the core and the storage chamber, means for moving the refuelling machine over the refuelling face, an optical periscope mounted on the machine and comprising an image reflector, means for moving the image reflector along a plane perpendicular to and traversing the axis of the transfer tube, and stop means limiting the movement to travel between a position coinciding with said axis to a position clear of the inner wall of said transfer tube, said image reflector being disposed so as to reflect light rays passing along said transfer tube from the end remote from said storage chamber.

2. The combination of claim 1 wherein said plug member comprises a seal plug for sealing off the core access channel.

3. Apparatus as set forth in claim 2 wherein said optical periscope comprises a first tubular member disposed adjacent the transfer tube and perpendicular to the axis thereof and a second tubular member disposed telescopically within the first tubular member, said image reflector being positioned adjacent the end of the second tubular member adjacent said transfer tube and arranged to reflect light rays passing along said transfer tube from the end remote from said storage chamber to the interior of said first tubular member, said means for moving the image reflector comprising means for moving said second tube, a second image reflector positioned adjacent the end of the first tubular member remote from said transfer tube and arranged to reflect light rays from the interior of said first tubular member to the exterior thereof.

References Cited in the file of this patent

UNITED STATES PATENTS

| 1,175,609 | Cottrell | Mar. 14, 1916 |
| 3,025,226 | Martin et al. | Mar. 13, 1962 |

FOREIGN PATENTS

| 67,017 | Norway | Nov. 1, 1943 |
| 844,765 | Great Britain | Aug. 17, 1960 |
| 1,057,249 | Germany | May 14, 1959 |

OTHER REFERENCES

Nucleonics, December 1956, pp. S22–S23.

Dent: J. Brit. Nucl. Energy Conf., April 1957, pp. 146–155.

Millar: Second Int'l Conf. on the Peaceful Uses of Atomic Energy, pp. 428–429, vol. 8, (1958).